(12) United States Patent
Kobayashi et al.

(10) Patent No.: US 10,700,625 B2
(45) Date of Patent: Jun. 30, 2020

(54) POWER CONVERSION DEVICE

(71) Applicant: Mitsubishi Electric Corporation, Tokyo (JP)

(72) Inventors: Takahiko Kobayashi, Tokyo (JP); Shinsaku Kusube, Tokyo (JP); Kazuyoshi Watabu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/343,541

(22) PCT Filed: Dec. 12, 2016

(86) PCT No.: PCT/JP2016/086893
§ 371 (c)(1),
(2) Date: Apr. 19, 2019

(87) PCT Pub. No.: WO2018/109801
PCT Pub. Date: Jun. 21, 2018

(65) Prior Publication Data
US 2020/0083835 A1  Mar. 12, 2020

(51) Int. Cl.
*H02M 5/458* (2006.01)
*H02M 1/44* (2007.01)
(Continued)

(52) U.S. Cl.
CPC ............. *H02P 27/04* (2013.01); *H02M 1/12* (2013.01); *H02M 1/44* (2013.01); *H02M 5/4585* (2013.01); *H02M 2001/123* (2013.01)

(58) Field of Classification Search
CPC .. H02M 2001/123; H02M 1/126; H02M 5/40; H02M 5/42; H02M 5/44;
(Continued)

(56) References Cited

U.S. PATENT DOCUMENTS 7,957,166 B2 * 6/2011 Schnetzka ............. H02M 7/003
363/40
10,177,702 B2 * 1/2019 Shimura ................. H02P 29/50
(Continued)

FOREIGN PATENT DOCUMENTS

CN      1851973 B   5/2010
CN    101527505 B   5/2012
(Continued)

OTHER PUBLICATIONS

Extended European Search Report dated Nov. 6, 2019 issued in corresponding European patent application No. 16923739.3.
(Continued)

*Primary Examiner* — Gary L Laxton
(74) *Attorney, Agent, or Firm* — Posz Law Group, PLC

(57) ABSTRACT

A power conversion device includes a filter unit including an active noise canceler including an active element reducing low frequency components contained in common mode noise of noise and lower than a predetermined threshold frequency, and a passive filter including a passive element reducing normal mode noise of noise and high frequency components contained in the common mode noise of noise and equal to or higher than the threshold frequency. The active noise canceler includes a choke coil having a primary winding to which a first alternating current power is supplied and a secondary winding outputting a current, a filter circuit reducing a high frequency region of the current of the secondary winding, an amplifier circuit amplifying output of the filter circuit and securing a required amount of the current, and a current injection circuit injecting output of the amplifier circuit to each phase of the first alternating current power.

9 Claims, 6 Drawing Sheets

(51) Int. Cl.
*H02P 27/04* (2016.01)
*H02M 1/12* (2006.01)

(58) Field of Classification Search
CPC ........ H02M 5/443; H02M 5/447; H02M 5/45; H02M 5/4505; H02M 5/451; H02M 5/452; H02M 5/453; H02M 5/456; H02M 5/458; H02M 5/4585; H02M 5/46; H02M 5/48; H02J 3/01; H02J 3/16; H02J 3/18; H02J 3/1807; H02J 3/1814; H02J 3/1821; H02J 3/1828; H02J 3/1842; H03H 7/427
See application file for complete search history.

(56) References Cited

U.S. PATENT DOCUMENTS

| 2004/0056661 | A1 | 3/2004 | Maeda et al. | |
|---|---|---|---|---|
| 2008/0298103 | A1 | 12/2008 | Bendre et al. | |
| 2013/0147419 | A1* | 6/2013 | Sakai | H02M 1/12 318/722 |
| 2015/0263600 | A1* | 9/2015 | Bhandarkar | H02M 7/219 363/44 |
| 2018/0048223 | A1 | 2/2018 | Pei et al. | |

FOREIGN PATENT DOCUMENTS

| CN | 104868466 | A | 8/2015 |
|---|---|---|---|
| JP | 3044650 | B2 | 5/2000 |
| JP | 2002-135973 | A | 5/2002 |
| JP | 2003-087973 | A | 3/2003 |
| JP | 2003-088099 | A | 3/2003 |
| JP | 4360202 | B2 | 11/2009 |
| JP | 5248713 | B2 | 7/2013 |
| JP | 5474772 | B2 | 4/2014 |
| WO | 2012/026186 | A1 | 3/2012 |
| WO | 2013/008925 | A1 | 1/2013 |
| WO | 2014/048471 | A1 | 4/2014 |
| WO | 2015/173006 | A1 | 11/2015 |

OTHER PUBLICATIONS

International Search Report of the International Searching Authority dated Jan. 17, 2017 for the corresponding international application No. PCT/JP2016/086893 (and English translation).

Office Action dated Mar. 10, 2020 issued in corresponding JP patent application No. 2018-556035 (and English translation).

* cited by examiner

FREQUENCY COMPONENTS CONTAINED IN NOISE

INTEGRATED CHARACTERISTIC OF ACTIVE NOISE CANCELER

ID DEVICE

CROSS REFERENCE TO RELATED APPLICATION

This application is a U.S. national stage application of PCT/JP2016/086893 filed on Dec. 12, 2016, the contents of which are incorporated herein by reference.

TECHNICAL FIELD

The present invention relates to a power conversion device that reduces noise when a motor is driven.

BACKGROUND ART

There has been conventionally known a power conversion device that reduces noise leaking to an alternating current power supply when a motor is driven. Noise includes two types: normal mode noise and common mode noise. Patent Literature 1 discloses a power conversion device that reduces the normal mode noise and the common mode noise using an active noise canceler having a voltage amplifier corresponding to an active element. Patent Literature 2 discloses a power conversion device that reduces the common mode noise by controlling a neutral point potential of the load using an active noise canceler having a switching element corresponding to an active element, and a power conversion device that reduces the normal mode noise by inserting a passive filter having a reactor corresponding to a passive element into an electric line through which an alternating current power flows.

CITATION LIST

Patent Literature

Patent Literature 1: Japanese Patent No. 5248713
Patent Literature 2: Japanese Patent No. 3044650

SUMMARY OF INVENTION

Technical Problem

Thus, the power conversion device disclosed in Patent Literature 1 and the power conversion devices disclosed in Patent Literature 2 reduce the noise using one of an active noise canceler and a passive filter. When the normal mode noise and the common mode noise are reduced using one of the active noise canceler and the passive filter, it is necessary to increase the amount of inductance of an inductor. In this case, as the inductor is increased in size, the power conversion device itself is increased in size.

The present invention has been made to solve the above problems and an object of the present invention is to provide a power conversion device that reduces normal mode noise and common mode noise without increasing a size of the power conversion device.

Solution to Problem

A power conversion device of an embodiment of the present invention includes a converter unit configured to convert a first alternating current power supplied from an alternating current power supply into a direct current power, an inverter unit configured to convert the direct current power into a second alternating current power by which the power conversion device is configured to drive a motor, and a filter unit provided between the alternating current power supply and the converter unit, and configured to reduce transmission of noise generated from the converter unit and the inverter unit to the alternating current power supply. The filter unit includes an active noise canceler including an active element configured to reduce low frequency components lower than a threshold frequency that is predetermined, the low frequency components being contained in common mode noise of the noise, and a passive filter including a passive element configured to reduce normal mode noise of the noise and high frequency components equal to or higher than the threshold frequency, the high frequency components being contained in the common mode noise of the noise. The active noise canceler includes a choke coil having a primary winding wound around a conductor to which the first alternating current power is supplied and a secondary winding configured to output a current depending on a magnetic flux generated by the primary winding, a filter circuit configured to reduce at least a high frequency region of the current of the secondary winding, an amplifier circuit configured to amplify output of the filter circuit and secure a required amount of the current, and a current injection circuit provided between the choke coil and the inverter unit, and configured to inject output of the amplifier circuit to each phase of the first alternating current power.

Advantageous Effects of Invention

According to an embodiment of the present invention, the passive filter is responsible for reducing the normal mode noise and reducing the high frequency components of the common mode noise, and therefore it is only required that the active noise canceler reduces only the low frequency components of the common mode noise. Thus, it is not necessary to increase the inductor in size. Consequently, the normal mode noise and the common mode noise can be reduced without increasing the power conversion device in size.

DESCRIPTION OF EMBODIMENTS

Embodiment 1

Figure 1:
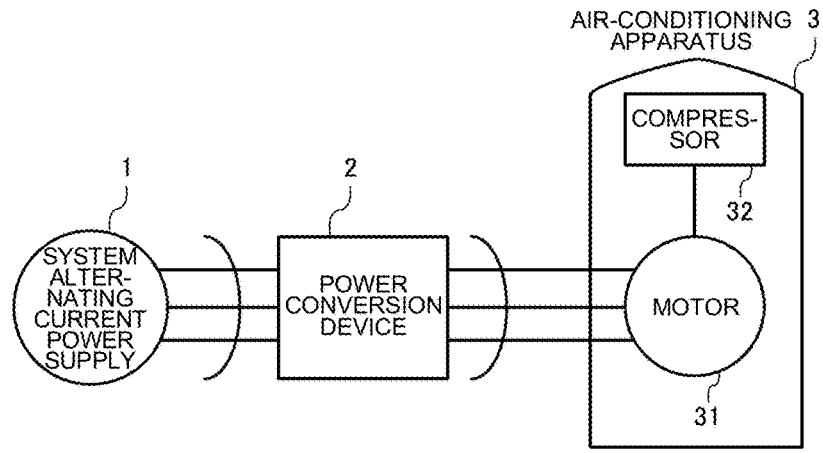
FIG. 1 is a block diagram illustrating an example in which a power conversion device 2 according to Embodiment 1 of the present invention is applied to an air-conditioning apparatus 3.

Embodiments of a power conversion device according to the present invention will be described hereinafter with reference to the drawings. FIG. 1 is a block diagram illustrating an example in which a power conversion device 2 according to Embodiment 1 of the present invention is applied to an air-conditioning apparatus 3. As illustrated in FIG. 1, the power conversion device 2 is provided between an alternating current power supply 1 and a motor 31 in the air-conditioning apparatus 3. The power conversion device 2 converts a first alternating current power supplied from the alternating current power supply 1 into a second alternating current power having voltage and frequency that are different from those of the first alternating current power, and outputs the second alternating current power to the motor 31. The alternating current power supply 1 is, for example, a three-phase system alternating current power supply. The motor 31 drives a compressor 32 in the air-conditioning apparatus 3, and the compressor 32 is configured to compress refrigerant.

Figure 2:
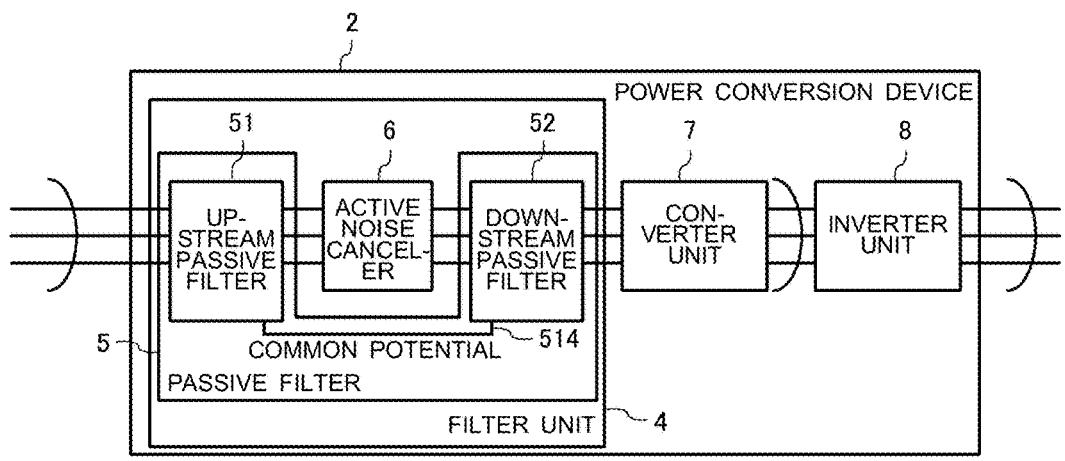
FIG. 2 is a block diagram illustrating a configuration of the power conversion device 2 according to Embodiment 1 of the present invention.

FIG. 2 is a block diagram illustrating a configuration of the power conversion device 2 according to Embodiment 1 of the present invention. As illustrated in FIG. 2, the power conversion device 2 includes a filter unit 4, a converter unit 7, and an inverter unit 8. The filter unit 4 outputs the first alternating current power supplied from the alternating current power supply 1 to the converter unit 7 and reduces the noise from the converter unit 7 and the inverter unit 8. Noise includes two types: normal mode noise and common mode noise.

The filter unit 4 includes a passive filter 5 and an active noise canceler 6. The passive filter 5 includes an upstream passive filter 51 provided between the alternating current power supply 1 and the active noise canceler 6, and a downstream passive filter 52 provided between the active noise canceler 6 and the converter unit 7. The converter unit 7 has a rectifying function of converting the first alternating current power output from the filter unit 4 into a direct current power to output the direct current power. The converter unit 7 may have a function of raising and lowering a rectified direct current using a known step-up-and-step-down chopper in addition to the rectifying function. The inverter unit 8 has a power converting function of converting the direct current power output from the converter unit 7 into the second alternating current power having voltage and frequency that are adjusted depending on conditions for driving the motor 31 to output the second alternating current power to the motor 31, and is, for example, a known two-level PWM inverter or a multi-level inverter. Note that two or more inverter units may be connected to the converter unit 7 in parallel to drive loads connected to the respective inverter units. Examples of the load connected to each of a plurality of inverter units include the motor 31 for driving the compressor 32, and a fan motor for driving a fan (not illustrated).

Figure 3:
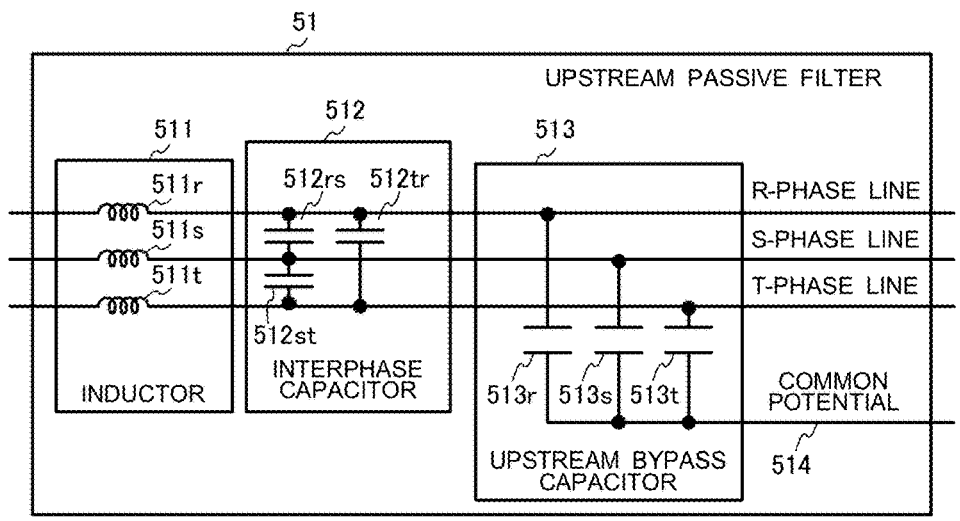
FIG. 3 is a circuit diagram illustrating an upstream passive filter 51 in Embodiment 1 of the present invention.

FIG. 3 is a circuit diagram illustrating the upstream passive filter 51 in Embodiment 1 of the present invention. As illustrated in FIG. 3, the upstream passive filter 51 includes an inductor 511, an interphase capacitor 512, and an upstream bypass capacitor 513. The inductor 511 includes a choke coil that is inserted in each of three-phase lines to which the first alternating current power is supplied, and each of the three-phase lines is covered with a magnetic body. The inductor 511 reduces the normal mode noise. Here, the three-phase lines are each referred to as a corresponding one of an R-phase line, an S-phase line, and a T-phase line. An R phase inductor 511 is referred to as an inductor 511r, an S phase inductor 511 is referred to as an inductor 511s, and a T phase inductor 511 is referred to as an inductor 511t.

The interphase capacitor 512 is provided across three-phase lines. The interphase capacitor 512 between the R-phase line and the S-phase line is referred to as an interphase capacitor 512rs, the interphase capacitor 512 between the S-phase line and the T-phase line is referred to as an interphase capacitor 512st, and the interphase capacitor 512 between the T-phase line and the R-phase line is referred to as the interphase capacitor 512tr. Note that the filter unit 4 includes a conductor having a common potential 514 that is a potential common to the upstream passive filter 51 and the downstream passive filter 52. The upstream bypass capacitor 513 is provided between the three-phase lines and the common potential 514. The upstream bypass capacitor 513 between the R-phase line and the common potential 514 is referred to as an upstream bypass capacitor 513r, the upstream bypass capacitor 513 between the S-phase line and the common potential 514 is referred to as an upstream bypass capacitor 513s, and the upstream bypass capacitor 513 between the T-phase line and the common potential 514 is referred to as an upstream bypass capacitor 513t.

Note that in Embodiment 1, an example has been shown where the upstream passive filter 51 includes all of the inductor 511, the interphase capacitor 512, and the upstream bypass capacitor 513, but the upstream passive filter 51 includes at least one of the inductor 511, the interphase capacitor 512, and the upstream bypass capacitor 513.

Figure 4:
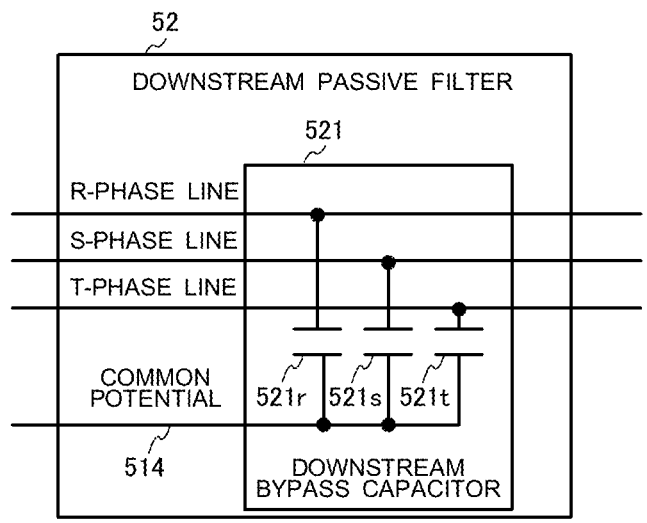
FIG. 4 is a circuit diagram illustrating a downstream passive filter 52 in Embodiment 1 of the present invention.

FIG. 4 is a circuit diagram illustrating the downstream passive filter 52 in Embodiment 1 of the present invention. As illustrated in FIG. 4, the downstream passive filter 52 includes a downstream bypass capacitor 521. The downstream bypass capacitor 521 is provided between the three-phase lines and the common potential 514. The downstream bypass capacitor 521 between the R-phase line and the common potential 514 is referred to as a downstream bypass capacitor 521r, the downstream bypass capacitor 521 between the S-phase line and the common potential 514 is referred to as a downstream bypass capacitor 521s, and the downstream bypass capacitor 521 between the T-phase line and the common potential 514 is referred to as a downstream bypass capacitor 521t.

Figure 5:
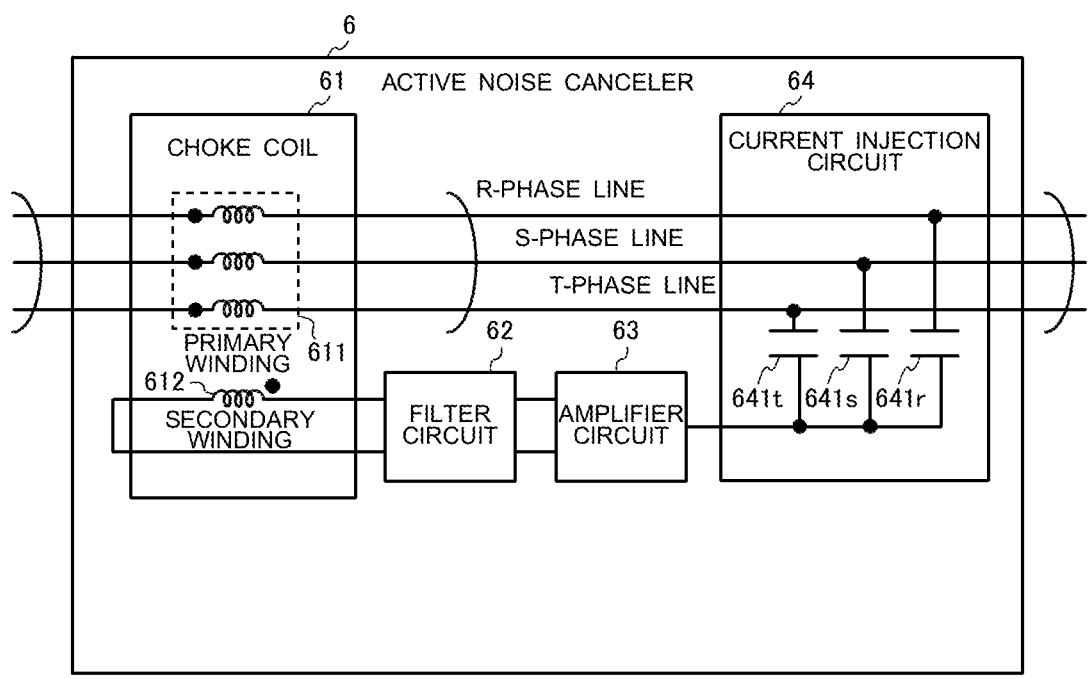
FIG. 5 is a block diagram illustrating an active noise canceler 6 in Embodiment 1 of the present invention.

FIG. 5 is a block diagram illustrating the active noise canceler 6 in Embodiment 1 of the present invention. As illustrated in FIG. 5, the active noise canceler 6 includes a choke coil 61, a filter circuit 62, an amplifier circuit 63, and a current injection circuit 64. The choke coil 61 includes primary windings 611 and a secondary winding 612. The output of the upstream passive filter 51 is input to the primary windings 611 of the choke coil 61. The output of the primary windings 611 of the choke coil 61 is output to the downstream passive filter 52 through the current injection circuit 64. Both terminals of the secondary winding 612 of the choke coil 61 are connected to the filter circuit 62, as input.

Figure 6:
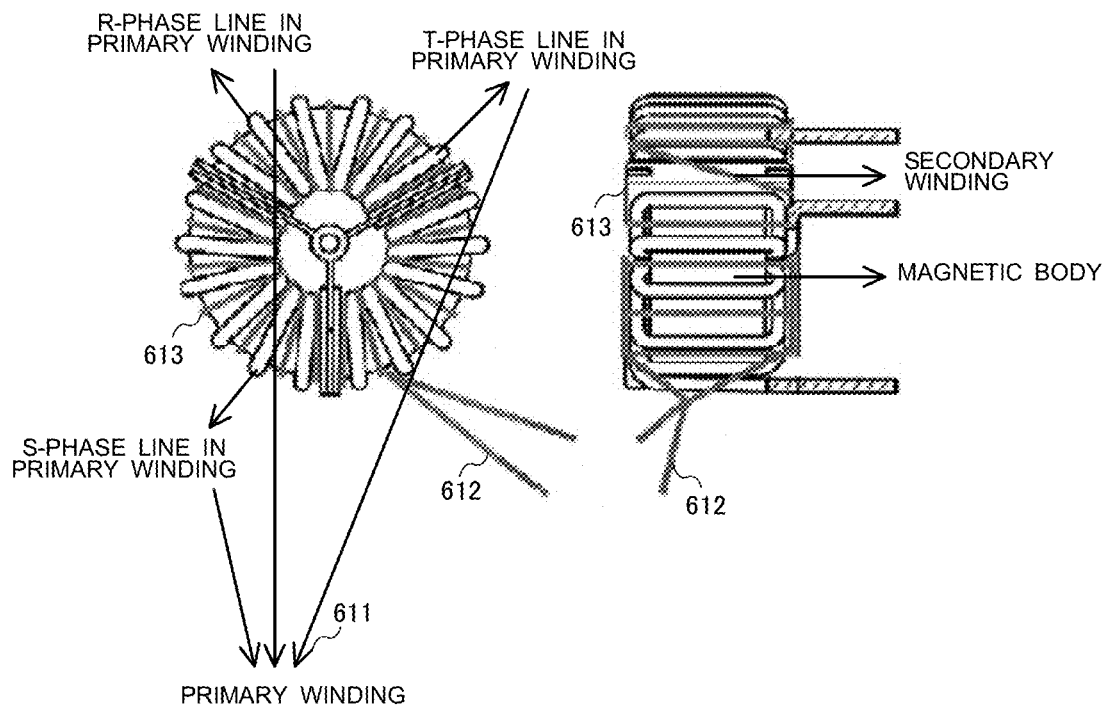
FIG. 6 includes diagrams illustrating a choke coil 61 in Embodiment 1 of the present invention.

FIG. 6 includes diagrams illustrating the choke coil 61 in Embodiment 1 of the present invention. As illustrated in FIG. 6, the primary windings 611 are windings that are each wound around a magnetic body 613, and the windings are three phase lines to which the first alternating current power is supplied. The primary windings 611 cancel a normal mode component to generate a magnetic flux based on the common mode noise in the magnetic body 613. The secondary winding 612 is also wound around the magnetic body 613, so that the filter circuit 62 detects an amount of current depending on the magnetic flux based on the common mode noise generated in the magnetic body 613 by the primary windings 611 and converts the amount of current into a voltage value.

Figure 7:
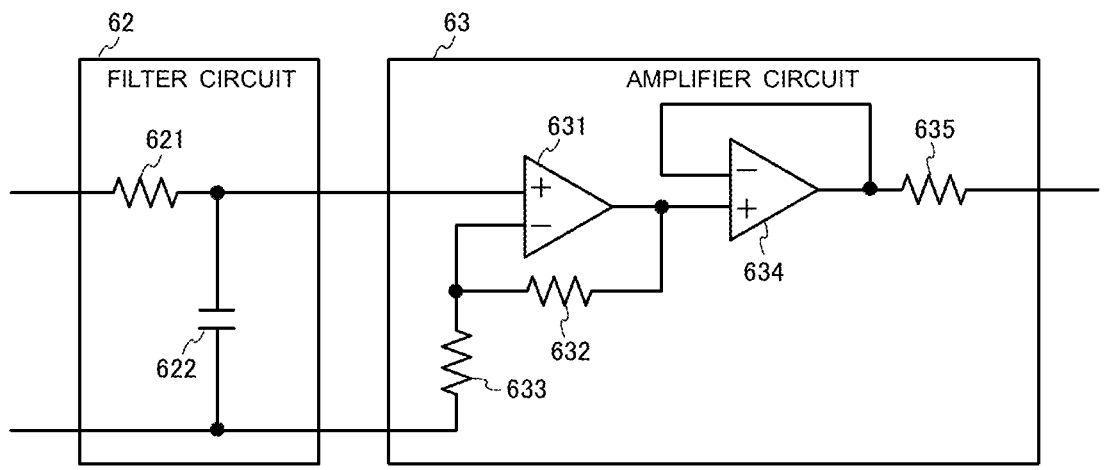
FIG. 7 is a circuit diagram illustrating a filter circuit 62 and an amplifier circuit 63 in Embodiment 1 of the present invention.

FIG. 7 is a circuit diagram illustrating the filter circuit 62 and the amplifier circuit 63 in Embodiment 1 of the present invention. As illustrated in FIG. 7, the secondary winding 612 is connected to the filter circuit 62, as input. When a time constant generated by the filter circuit 62 is set as a frequency threshold, the filter circuit 62 is a circuit configured to output a common mode noise signal in which a high frequency region higher than the frequency threshold is reduced. The filter circuit 62 illustrated in FIG. 7 is a low-pass filter including a resistor 621 and a capacitor 622. The resistor 621 is connected to one terminal of the secondary winding 612 in series. One end of the capacitor 622 is connected to a terminal of the resistor 621 that is not connected to the secondary winding 612, and the other end of the capacitor 622 is connected to the other terminal of the secondary winding 612. The secondary winding 612, the resistor 621, and the capacitor 622 are connected to form a closed circuit, and an amount of current based on the common mode noise flowing through this closed circuit is converted into an inter-terminal voltage value of the capacitor 622. Note that the filter circuit 62 may be a band-pass filter.

The amplifier circuit 63 connected to the filter circuit 62 is a circuit configured to amplify the common mode noise signal output from the filter circuit 62 using an active element such as an operational amplifier, and secure and output the amount of current that can be charged to and discharged from injection capacitor 641 in the current injection circuit 64. In FIG. 7, the amplifier circuit 63 includes a first operational amplifier 631, a first resistor 632, a second resistor 633, a second operational amplifier 634, and a protection resistor 635. One of the outputs of the filter circuit 62 is connected to a positive terminal of the first operational amplifier 631. One terminal of the second resistor 633 is connected to a negative terminal of the first operational amplifier 631. An output terminal of the first operational amplifier 631 is connected and fed back to the negative terminal of the first operational amplifier 631 through the first resistor 632. Furthermore, the other terminal of the second resistor 633 is connected to the other output of the filter circuit 62. That is, the first operational amplifier 631, the first resistor 632, and the second resistor 633 are connected to form a non-inverting amplifier circuit.

The output terminal of the first operational amplifier 631 is connected to a positive terminal of the second operational amplifier 634, and an output terminal of the second operational amplifier 634 is connected and fed back to a negative terminal of the second operational amplifier 634. That is, a voltage follower circuit is formed by the second operational amplifier 634. The output terminal of the second operational amplifier 634 is connected to the current injection circuit 64 through the protection resistor 635.

The current injection circuit 64 will be described with reference to FIG. 5. As illustrated in FIG. 5, the current injection circuit 64 has one end connected to the amplifier circuit 63, and the other ends having the injection capacitor 641 connected to the three-phase lines in which the current having passed through the primary windings 611 flows. The injection capacitor 641 between the R-phase line and the amplifier circuit 63 is referred to as an injection capacitor 641r, the injection capacitor 641 between the S-phase line and the amplifier circuit 63 is referred to as an injection capacitor 641s, and an injection capacitor 641 between the T-phase line and the amplifier circuit 63 is referred to as an injection capacitor 641t. Note that the output of the amplifier circuit 63 is connected to each of the R-phase line, the S-phase line, and the T-phase line through the injection capacitor 641. Note that an inductor may be used instead of the injection capacitor.

Next, the operation of the power conversion device 2 will be described. First of all, the power conversion device 2 reduces, using the passive filter 5 and the active noise canceler 6, the normal mode noise and the common mode noise that are generated in the converter unit 7 or the inverter unit 8, to reduce the noise transmission to the alternating current power supply 1. In the power conversion device 2, the converter unit 7 converts the first alternating current power into a direct current power. In the power conversion device 2, the inverter unit 8 converts the direct current power output from the converter unit 7 into a second alternating current power to output the second alternating current power to the motor 31 in the air-conditioning apparatus 3. The compressor 32 in the air-conditioning apparatus 3 is driven by the motor 31 to which the second alternating current power is applied.

Next, the operation of reducing the noise of the power conversion device 2 will be described. When, in a component among passive elements having an inductance, such as a coil, the amount of the inductance is L [H], the amount of impedance to a signal having a frequency of f [Hz] is $2\pi f L$ [Ω]. Here, $\pi$ is a circle ratio. Thus, in a case where the component having an inductance is inserted in series into the signal, as the frequency f is increased, the impedance also increases. Consequently, the higher the frequency f is, the more the noise having the frequency f is reduced.

On the other hand, when, in a component among passive elements having a capacitance, such as a capacitor, the amount of the capacitance is C [F], the amount of impedance to the signal having a frequency of f [Hz] is $(\frac{1}{2\pi f C})$ [Ω]. Thus, as the frequency f is increased, the impedance of the component having the capacitance decreases. Consequently, in a case where the component having the capacitance is inserted into a noise transmission path, the higher the frequency f is, the more the noise having the frequency f is reduced.

Figure 8:
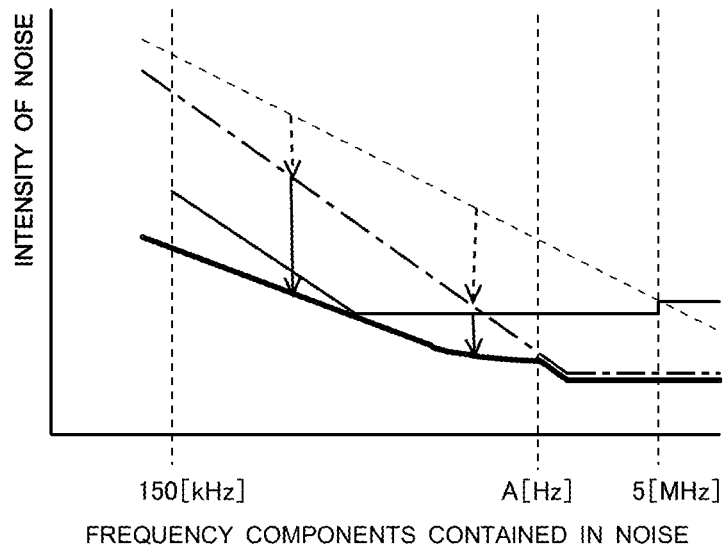
FIG. 8 is a graph showing a noise reduction amount of the power conversion device 2 according to Embodiment 1 of the present invention.

FIG. 8 is a graph showing a noise reduction amount of the power conversion device 2 according to Embodiment 1 of the present invention. In FIG. 8, the horizontal axis represents a frequency [Hz] of a component contained in the noise, and the vertical axis represents the intensity of noise. The oblique dotted line of FIG. 8 shows a graph showing the amount of noise generated from the converter unit 7 and the inverter unit 8. The one-dot chain line of FIG. 8 is a graph showing the amount of noise after the noise is reduced only using the passive filter 5 and the choke coil 61, that is, without using the filter circuit 62, the amplifier circuit 63, and the current injection circuit 64. The thin line in FIG. 8 is a graph showing the upper limit amount of noise required by the standard or other criteria. The thick line in FIG. 8 is a graph showing the amount of noise after the noise is reduced using the power conversion device 2 of Embodiment 1. Note that the noise having a frequency of 5 [MHz] or higher satisfies the standard. The frequency of A [Hz] is a predetermined threshold frequency, which is described later. As shown by comparing the dotted line and the one-dot chain line in FIG. 8, the higher the frequency is, the more the amount of noise represented by the one-dot chain line in FIG. 8 is reduced.

For example, four units are conceivable to reduce the amount of noise represented by the one-dot chain line in FIG. 8 to the amount of noise represented by the thin line in FIG. 8 only using the passive filter 5 and the choke coil 61. The first unit is to increase the amount of inductance of the inductor 511. The second unit is to increase the amount of capacitance of the upstream bypass capacitor 513 of the upstream passive filter 51. The third unit is to increase the amount of capacitance of the downstream bypass capacitor 521 of the downstream passive filter 52. The fourth unit is to increase the amount of inductance of the choke coil 61.

However, the increase in the amount of capacitance of the upstream bypass capacitor 513 or the downstream bypass capacitor 521 causes the increase in the amount of leakage current, which may lead to the reduction in the conversion efficiency and the occurrence of electrical leakage. The increase in the amount of inductance of the inductor 511 or the choke coil 61 causes the increase in the component volume and the increase in the component weight. As the component volume and the component weight increase, it is necessary to toughen the device on which the component is mounted, which may cause the increase in cost.

In contrast, in Embodiment 1, in the active noise canceler 6, the common mode noise current of the alternating current power detected by the secondary winding 612 of the choke coil 61 is converted into the frequency characteristics of the filter circuit 62 and the amplifier circuit 63, and the voltage value is applied to each of the R-phase line, the S-phase line, and the T-phase line through which the alternating current power flows, through the injection capacitor 641 of the current injection circuit 64, to thereby reduce the common mode noise.

Figure 9:
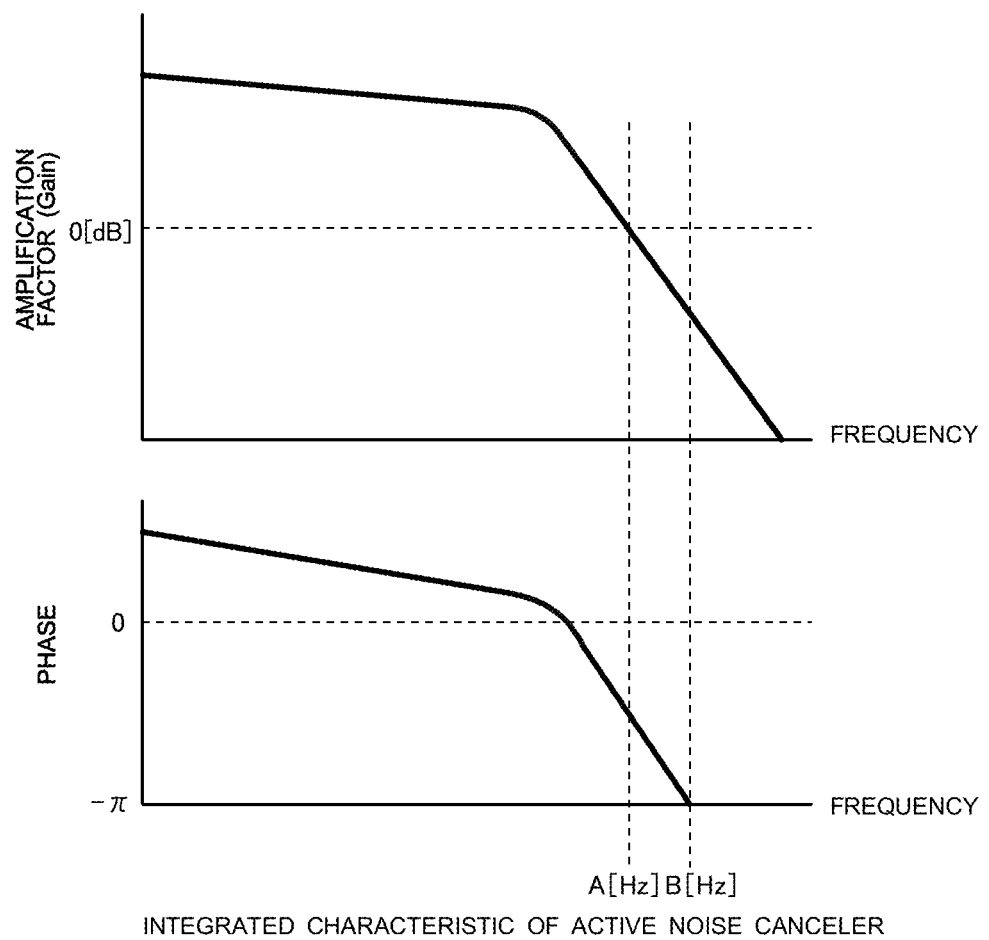
FIG. 9 includes graphs showing an integrated characteristic of the active noise canceler 6 in Embodiment 1 of the present invention.

FIG. 9 includes graphs showing the integrated characteristic of the active noise canceler 6 in Embodiment 1 of the present invention. Here, the integrated characteristic of the active noise canceler 6 is a characteristic integrating a winding ratio of the primary windings 611 and the secondary winding 612 in the choke coil 61, a characteristic of the filter circuit 62, which is a low-pass filter, and an amplification factor and a phase characteristic of the amplifier circuit 63. An upper graph of FIG. 9 shows a characteristic of the amplification factor (Gain) to the frequency. In the upper graph of FIG. 9, the horizontal axis represents the frequency [Hz], and the vertical axis represents the amplification factor (Gain) [dB (decibel)]. A lower graph of FIG. 9 shows a phase characteristic to the frequency. In the lower graph of FIG. 9, the horizontal axis represents the frequency [Hz], and the vertical axis represents the phase [rad (radian)]. The horizontal axis of the upper graph of FIG. 9 is the same as the horizontal axis of the lower graph of FIG. 9. A feature of the amplification function of the amplifier circuit 63 in the active noise canceler 6 is that as the frequency of f [Hz] is increased, the amplification factor is decreased and the phase is delayed. As the integrated characteristic of the entire active noise canceler 6, when the frequency off [Hz] is increased, the amplification factor is first gradually decreased, and is abruptly decreased from the frequency at which the amplification function of the amplifier circuit 63 is deteriorated. A feature of the phase characteristic is that as the frequency of f [Hz] is increased, the phase is first gradually delayed, and is abruptly delayed from the frequency at which the amplification factor of the amplifier circuit 63 is abruptly decreased. Then, the frequency of the entire active noise canceler 6 reaches the frequency at which the phase is inverted (the phase is $\pi$ [rad]). The frequency at which the phase of the entire active noise canceler 6 is inverted is B [Hz] as shown in FIG. 9.

In Embodiment 1, the active noise canceler 6 is set to reduce the noise in the frequency region lower than the predetermined frequency of A [Hz] equal to or lower than the frequency of B [Hz]. The characteristic of each of the choke coil 61, the filter circuit 62, and the amplifier circuit 63 is set so that the amplification factor of the active noise canceler 6 is 1 or less, that is, the amplification factor is 0 [dB] or less at the threshold frequency of A [Hz]. Thus, the amount of noise represented by the one-dot chain line of FIG. 8 can be reduced to the amount of noise represented by the thick line of FIG. 8. Note that the threshold frequency of A [Hz] is preferably set within a range from 800 [kHz] to 2 [MHz] in consideration of the performances and the prices of the first operational amplifier 631 and the second operational amplifier 634 in the amplifier circuit 63.

According to Embodiment 1, the upstream passive filter 51 is responsible for reducing the normal mode noise and reducing the high frequency components of the common mode noise, and therefore it is only required that the active noise canceler 6 reduces only the low frequency components of the common mode noise. Thus, it is not necessary to increase the inductor 511 in size. Consequently, the normal mode noise and the common mode noise can be reduced without increasing the power conversion device 2 in size.

Typically, it is necessary to set the inductance of the choke coil 61 to 1,000 [µH] or more to satisfy the noise standard without using the filter circuit 62 and the amplifier circuit 63 of the active noise canceler 6. In contrast, when both of the passive filter 5 and the active noise canceler 6 share the noise reduction as in Embodiment 1, the inductance of the choke coil 61 can be reduced to 100 [µH] to several hundreds of [µH]. Thus, the cost of the component having the inductance can be reduced. As the component having the inductance is reduced in size, the heat generation amount of the component having the inductance can be reduced, thereby improving the conversion efficiency of the power conversion device 2. The component having the inductance that has been reduced in size and weight can be mounted in an electric circuit board, and therefore it is not necessary to provide a dedicated structure for fixing the component when the component is mounted in the air-conditioning apparatus 3. Consequently, the cost can be reduced.

Furthermore, when the component having the inductance is reduced in the volume, the compressor 32 can be increased in size in the air-conditioning apparatus 3 having the same shape. Thus, the performance of the air-conditioning apparatus 3 can be improved. As both of the passive filter 5 and the active noise canceler 6 share the noise reduction, it is only required to select the noise bandwidth to be reduced by each of the passive filter 5 and the active noise canceler 6 and the passive filter 5 and the active noise canceler 6 are set separately so that at least selected bandwidth can be reduced. Consequently, the passive filter 5 and the active noise canceler 6 can be designed easily.

As the active noise canceler 6 includes the filter circuit 62, which is a low-pass filter, the amplifier circuit 63 can reduce the amplification factor to 1 or less, that is, 0 [dB] or less in the frequency region in which the phase is inversed. In this way, the operation of the active noise canceler 6 can be stabilized. Furthermore, as the choke coil 61 of the active noise canceler 6 includes the primary windings 611 and the secondary winding 612, the common mode noise current can be amplified by the winding ratio of the primary windings 611 and the secondary winding 612. The amplifier performances of the first operational amplifier 631 and the second operational amplifier 634 in the amplifier circuit 63 can be reduced, accordingly. Thus, the costs of the first operational amplifier 631 and the second operational amplifier 634 can be reduced. As the choke coil 61 of the active noise canceler 6 includes the primary windings 611 and the secondary winding 612, and the current injection circuit 64 includes the injection capacitor 641, components for low pressure can be used for the filter circuit 62 and the amplifier circuit 63. Consequently, the costs of components used for the filter circuit 62 and the amplifier circuit 63 can be reduced.

Note that the case where the filter circuit 62 and the amplifier circuit 63 are not connected to the common potential 514 is described in Embodiment 1; however, the effect of the present invention is not lost even when a connecting point between the capacitor 622 in the filter circuit 62 and the second resistor 633 in the amplifier circuit 63 is connected to the common potential 514.

Even when the upstream bypass capacitor 513 and the downstream bypass capacitor 521 are integrated in the upstream passive filter 51 or in the downstream passive filter 52, the effect of the present invention is not lost.

Embodiment 2

Figure 10:
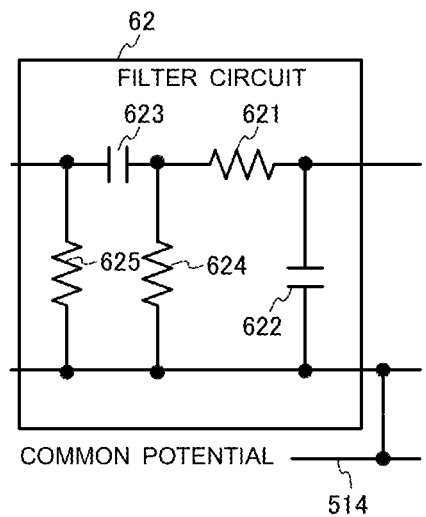
FIG. 10 is a circuit diagram illustrating a filter circuit 62 in Embodiment 2 of the present invention.

FIG. 10 is a circuit diagram illustrating a filter circuit 62 in Embodiment 2 of the present invention. Embodiment 2 is different from Embodiment 1 in that the filter circuit 62 is a bandpass filter. In Embodiment 2, the same components as those in Embodiment 1 are denoted by the same reference signs, and the description of the components will be omitted. The following description will be made mainly by referring to differences from Embodiment 1.

As illustrated in FIG. 10, the filter circuit 62 is a bandpass filter in which a resistor 625 configured to convert the current of the secondary winding 612 into a voltage value, a bypass filter, and a low-pass filter are combined. The filter circuit 62 of Embodiment 2 includes a resistor 621, a capacitor 622, a capacitor 623, a resistor 624, and the resistor 625. Both ends of the resistor 625 are each connected to a corresponding one of both terminals of the secondary winding 612. The capacitor 623 and the resistor 624 are connected in series. A terminal of the capacitor 623 that is not connected to the resistor 624 is connected to one terminal of the secondary winding 612. A terminal of the resistor 624 that is not connected to the capacitor 623 is connected to the other terminal of the secondary winding 612. Furthermore, a connecting point between the capacitor 623 and the resistor 624 is connected to one terminal of the resistor 621. The other terminal of the resistor 621 is connected to one terminal of the capacitor 622. The other terminal of the capacitor 622 is connected to a connecting point between the secondary winding 612 and the resistor 624, and is connected to the common potential 514. The connecting point between the resistor 621 and the capacitor 622 serves as an output terminal to the amplifier circuit 63. The capacitor 623 and the resistor 624 form the high-pass filter that reduces the low frequency region of a threshold frequency of C [Hz] or lower, and the threshold frequency of C [Hz] is lower than the above-described threshold frequency of A [Hz]. The resistor 621 and the capacitor 622 form the low-pass filter similar to that in Embodiment 1.

The intensity of noise at 150 [kHz] or lower is large as shown by the oblique dotted line of FIG. 8. On the other hand, in the frequency band of 150 [kHz] or higher, the allowable value of the power supply terminal conduction interference is defined by standards. Examples of the standard include the standard of VCCI Council, a general incorporated foundation, and European Norm (European unified standard) EN61000-6-3. In the frequency band lower than 150 [kHz], the amount of noise generation is not defined in the standard. From the viewpoint of the standard, there is no need for a countermeasure for noise, but from the viewpoint of the actual operation, it is preferable to reduce the noise.

Figure 11:
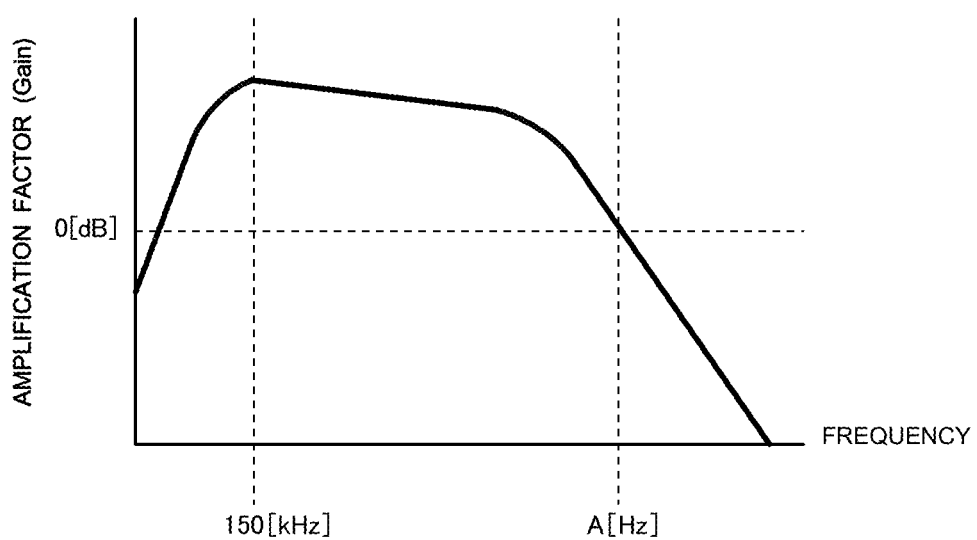
FIG. 11 is a graph showing an integrated characteristic of an active noise canceler 6 in Embodiment 2 of the present invention.

FIG. 11 is a graph showing an integrated characteristic of the active noise canceler 6 in Embodiment 2 of the present invention. In FIG. 11, the horizontal axis represents the frequency [Hz], and the vertical axis represents the amplification factor (Gain) [dB (decibel)]. As shown in FIG. 11, in the active noise canceler 6, in the amplification function of the amplifier circuit 63, the second threshold frequency of C [Hz] is defined as 150 [kHz], and the noise intensity lower than 150 [kHz] is reduced.

Thus, in Embodiment 2, the unit of reducing the noise reduces the frequency characteristic in the low frequency region, and therefore the first operational amplifier 631 and the second operational amplifier 634 of the amplifier circuit 63 can reduce the corresponding input amplitude in addition to the effect of Embodiment 1. Thus, the costs of the first operational amplifier 631 and the second operational amplifier 634 can be reduced.

Embodiment 3

Figure 12:
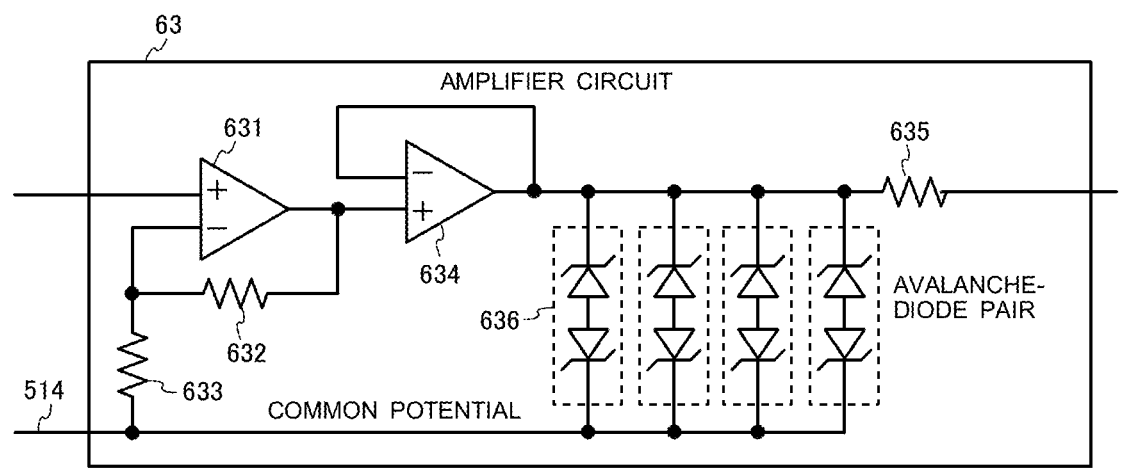
FIG. 12 is a circuit diagram illustrating an amplifier circuit 63 in Embodiment 3 of the present invention.

FIG. 12 is a circuit diagram illustrating an amplifier circuit 63 in Embodiment 3 of the present invention. Embodiment 3 is different from Embodiment 1 in that the amplifier circuit 63 includes avalanche-diode pairs 636. In Embodiment 3, the same components as those in Embodiment 1 are denoted by the same reference signs, and the description of the components will be omitted. The following description will be made mainly by referring to differences from Embodiment 1.

Embodiment 3 illustrates the power conversion device 2 in which a measure against a case where a surge voltage such as thunder is applied is adopted. In a case where a large surge voltage such as thunder is applied to an electric line through which the first alternating current power flows, the current injection circuit 64 is insulated from the alternating current power, but a large voltage is applied to the amplifier circuit 63. As a measure against the surge voltage, a resistor having a large resistance value, a capacitor having a large capacitance value, a varistor, or other countermeasure components is usually used. However, as the amplifier circuit 63 handles the common mode noise current having high frequency components, it is difficult to adopt the resistor having a large resistance value and the capacitor having a large capacitance value. The varistor requires an enormous amount of time until the effect is attained.

In Embodiment 3, as illustrated in FIG. 12, the amplifier circuit 63 includes the avalanche-diode pairs 636 between the common potential 514 and the electric line through which the current output from the amplifier circuit 63 flows, and diodes of each of the avalanche-diode pairs 636 are connected from directions opposite to each other. Here, the number of avalanche-diode pairs 636 is determined on the basis of the amount of current for releasing the surge voltage to the common potential 514.

Thus, in Embodiment 3, the measure against surge voltage is adopted, thereby capable of attaining the effect of adopting the measure against the common mode noise current and the measure against the surge voltage in addition to the effects of Embodiment 1 and Embodiment 2. Note that, in Embodiment 3, the same effect can be attained even when zener diode pairs are used instead of the avalanche-diode pairs 536.

Embodiment 4

Embodiment 4 illustrates a case where the motor 31 has a neutral point. In Embodiment 4, the conductor (electric line) having the common potential 514 is connected to the neutral point of the motor 31. With this configuration, the effect of reducing the noise due to the leakage current from the motor 31 can be attained in addition to the effects of Embodiment 1 to Embodiment 3.

Embodiment 5

Embodiment 5 illustrates a case where the alternating current power supply 1 has a neutral point. In Embodiment 5, the conductor (electric line) having the common potential 514 is connected to the neutral point of the alternating current power supply 1. In the choke coil 61 of the active noise canceler 6, the neutral point of the alternating current power supply 1 can be handled as the primary windings 611 together with the R-phase line, the S-phase line, and the T-phase line.

With this configuration, the effect of reducing the common mode noise contained in the alternating current power supply 1 can be attained in addition to the effects of Embodiment 1 to Embodiment 4.

Note that Embodiment 1 to Embodiment 5 described above illustrate a case where the power conversion device 2 is applied to the air-conditioning apparatus 3, but the power conversion device 2 can be applied to a press compressor and a resin molding machine using any of other motors.

REFERENCE SIGNS LIST

1 Alternating current power supply, 2 Power conversion device, 3 Air-conditioning apparatus, 4 Filter unit, 5 Passive filter, 6 Active noise canceler, 7 Converter unit, 8 Inverter unit, 31 Motor, 32 Compressor, 51 Upstream passive filter, 52 Downstream passive filter, 61 Choke coil, 62 Filter circuit, 63 Amplifier circuit, 64 Current injection circuit, 511, 511r, 511s, 511t Inductor, 512, 512rs, 512st, 512tr Interphase capacitor, 513, 513r, 513s, 513t Upstream bypass capacitor, 514 Common potential, 521, 521r, 521s, 521t Downstream bypass capacitor, 611 Primary winding, 612 Secondary winding, 613 Magnetic body, 621 Resistor, 622 Capacitor, 623 Capacitor, 624 Resistor, 625 Resistor, 631 First operational amplifier, 632 First resistor, 633 Second resistor, 634 Second operational amplifier, 635 Protection resistor, 636 Avalanche-diode pair, 641r, 641s, 641t Injection capacitor

The invention claimed is:
1. A power conversion device, comprising:
a converter unit configured to convert a first alternating current power supplied from an alternating current power supply into a direct current power;
an inverter unit configured to convert the direct current power into a second alternating current power by which the power conversion device is configured to drive a motor; and
a filter unit provided between the alternating current power supply and the converter unit,
the filter unit including
an active noise canceler including an active element configured to reduce low frequency components lower than a predetermined threshold frequency, the low frequency components being contained in a common mode noise, and
a passive filter including a passive element configured to reduce a normal mode noise and high frequency components equal to or higher than the predetermined threshold frequency, the high frequency components being contained in the common mode noise,
the active noise canceler including
a choke coil having a primary winding wound around a conductor to which the first alternating current power is supplied and a secondary winding configured to output a current depending on a magnetic flux generated by the primary winding,
a filter circuit configured to reduce at least a high frequency region of the current of the secondary winding,
an amplifier circuit configured to amplify output of the filter circuit and secure a required amount of the current, and
a current injection circuit provided between the choke coil and the inverter unit, and configured to inject output of the amplifier circuit to each phase of the first alternating current power,
the passive filter including any one of
an upstream passive filter provided between the alternating current power supply and the active noise canceler, and
a downstream passive filter provided between the active noise canceler and the converter unit.
2. The power conversion device of claim 1, wherein the passive filter includes at least one of
an inductor or a magnetic material configured to reduce the normal mode noise,
an interphase capacitor provided between phases of the conductor to which the first alternating current power is supplied, and
a bypass capacitor provided between the conductor to which the first alternating current power is supplied and a conductor having a common potential.
3. The power conversion device of claim 1, wherein the first alternating current power is a three-phase alternating current power.
4. The power conversion device of claim 1, wherein the motor functions as a compressor of an air-conditioning apparatus.
5. The power conversion device of claim 1, wherein the predetermined threshold frequency is a frequency lower than a frequency at which a phase characteristic of the amplifier circuit is inverted.
6. The power conversion device of claim 1, wherein the current injection circuit is configured to inject output of the amplifier circuit to each phase of the first alternating current power through capacitors.
7. The power conversion device of claim 1, wherein the current injection circuit is configured to inject output of the amplifier circuit to each phase of the first alternating current power through inductors.

8. The power conversion device of claim 1, wherein
the amplifier circuit includes any one of an avalanche-diode pair and a zener diode pair between an electric line through which a current output from the amplifier circuit flows and an electric line having a common potential, and
diodes of the any one of the avalanche-diode pair and the zener diode pair are connected from directions opposite to each other.

9. The power conversion device of claim 1, wherein
the filter unit includes a conductor having a common potential connecting an upstream bypass capacitor of the upstream passive filter and a downstream bypass capacitor in the downstream passive filter.

* * * * *